No. 839,943. PATENTED JAN. 1, 1907.
E. A. MARSH.
MICROMETER GAGE.
APPLICATION FILED JULY 7, 1906.
2 SHEETS—SHEET 2.
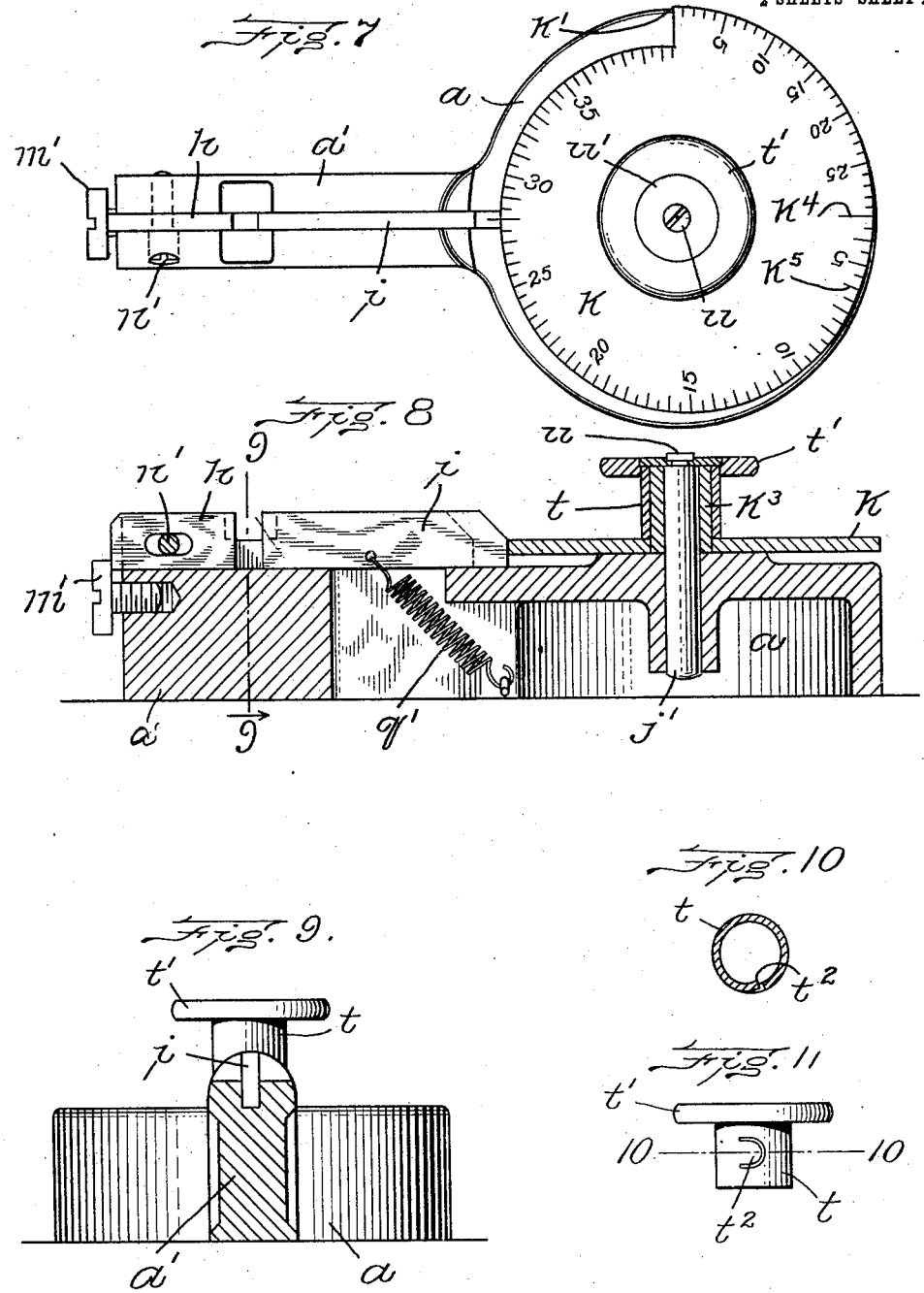

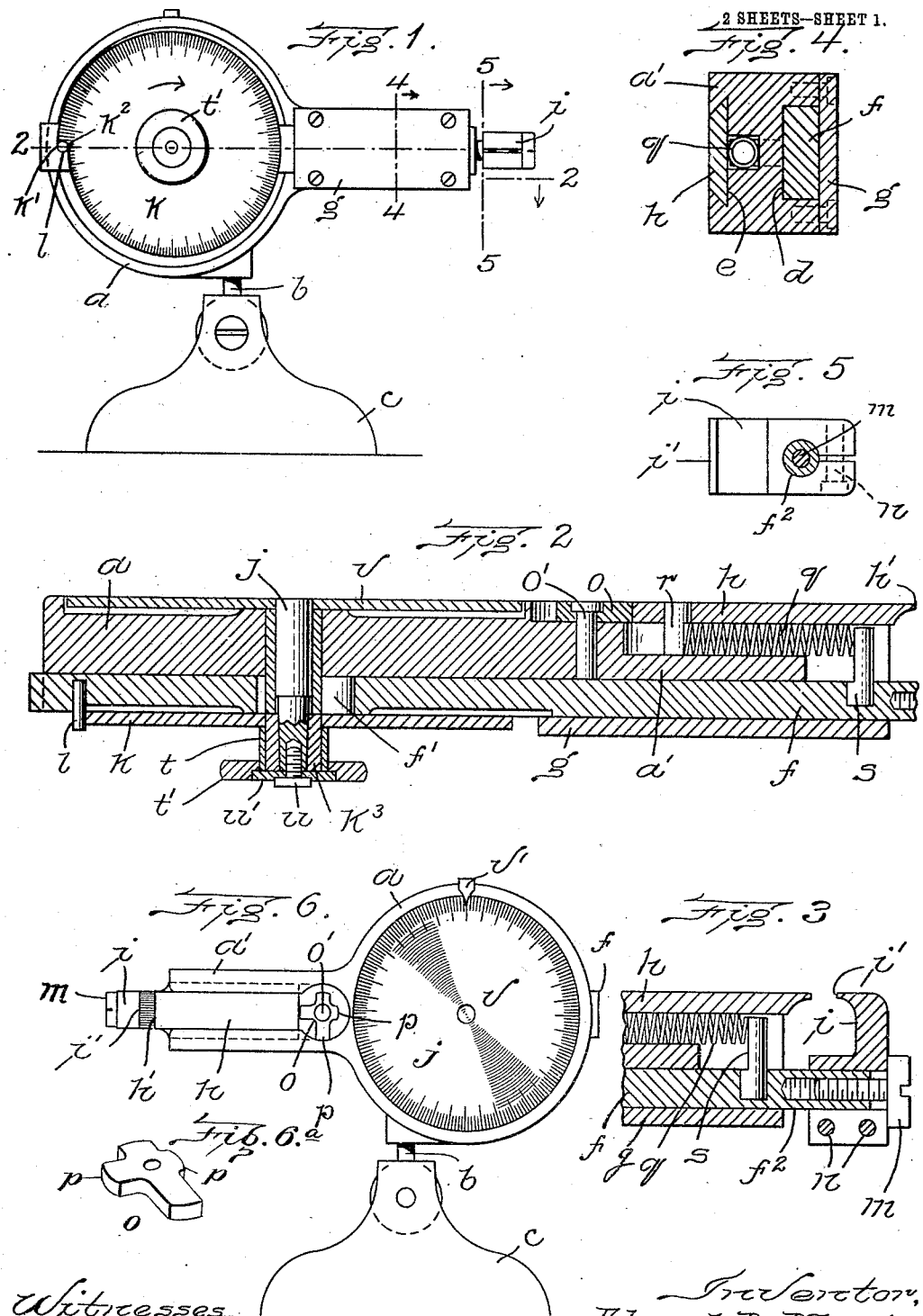

UNITED STATES PATENT OFFICE.

EDWARD A. MARSH, OF NEWTON, MASSACHUSETTS.

MICROMETER-GAGE.

No. 839,943.        Specification of Letters Patent.        Patented Jan. 1, 1907.

Application filed July 7, 1906. Serial No. 325,143.

*To all whom it may concern:*

Be it known that I, EDWARD A. MARSH, of Newton, in the county of Middlesex and State of Massachusetts, have invented certain new and useful Improvements in Micrometric Gages, of which the following is a specification.

This invention relates to micrometric measuring-instruments, and is designed to provide an improved form of caliper or gage by which minute differences in the dimensions of small mechanical parts may be detected.

In the manufacture of large numbers of parts of mechanisms which must be as nearly uniform as possible to secure interchangeability, such as in the parts of watch-movements, it is essential to provide instruments of sufficient delicacy to detect exceedingly slight variations from the standard dimensions.

My object has been to secure such an instrument, and by the present invention I have provided one which is capable of measuring small dimensions with accuracy and is of convenient form and size and simple and durable in construction and accordingly capable of being made and sold at a small price.

In its essential elements my improved measuring instrument consists of two jaws or gage members, one of which is relatively stationary, while the other is movable and is actuated by a spiral or snail-shaped cam having a large extent of angular movement to produce a very slight rectilinear movement in the measuring-jaw. The cam is provided with a circular series of graduation-marks, which are proportional to the eccentricity of the cam at corresponding points and serve to measure on a greatly enlarged scale the movement of the measuring-jaw. These elements and other features are illustrated in detail in the accompanying drawings and hereinafter described and claimed.

In the drawings, Figure 1 represents an elevation of a measuring instrument embodying the principles of my invention. Fig. 2 represents a section, on an enlarged scale, on line 2 2 of Fig. 1, showing all but the extreme right-hand end of the instrument. Fig. 3 represents a sectional view showing the parts omitted in Fig. 2. Fig. 4 represents a cross-section on line 4 4 of Fig. 1. Fig. 5 represents a section on line 5 5 of Fig. 1. Fig. 6 represents an elevation as seen from the rear of Fig. 1. Fig. 6$^a$ represents a perspective view of the stop member shown in Fig. 6. Fig. 7 represents a view similar to Fig. 1 of a modification of the instrument designed for special work. Fig. 8 represents a longitudinal section of Fig. 7. Fig. 9 represents a cross-sectional view on line 9 9 of Fig. 8 looking toward the right. Figs. 10 and 11 represent a section and an elevation, respectively, of the frictional actuator for the cam.

The same reference characters indicate the same parts in all the figures.

Referring to the drawings, Figs. 1 to 6, inclusive, show a form of the instrument designed for general work. This consists of a body portion or holder $a$, which may be held in the hand of the user or set upon a pin $b$, which is pivotally mounted in a base $c$, upon which it may be held in any position.

The body portion is provided with an outwardly-extending arm $a'$, in the opposite sides of which are formed guideways $d$ and $e$, respectively. In the guideway $d$ is set a slidable bar $f$, which is held in place by a cover-plate $g$, screwed to the arm $a'$, while in the guideway $e$ is set a slide $h$, held in place by the overhanging sides of the guideway $e$. The slide $h$ is normally held stationary and has a square edge $h'$, Fig. 6, on its outer end, which serves as a normally stationary caliper jaw or abutment, while the bar $f$ carries upon its end a coöperating movable caliper jaw or gage member $i$. The member $i$ has a square edge $i'$, which is adapted to abut against the edge $h'$ of the abutment $h$.

Secured upon a stud $j$ is a disk $k$, which has an eccentric periphery no two parts of which are at the same distance from the axis of the stud. Beginning with the most extended portion $k'$ each successive point of the periphery of the cam is nearer the axis, so that the periphery has the form of an involute curve or spiral beginning at $k'$ and ending at $k^2$ on the same radius. The stud $j$ is journaled in the body portion $a$ and passes through a slot $f'$ in the slide-bar $f$. This bar extends entirely across the cam and has a pin $l$ engaging the periphery of the cam. When the cam is in the position shown in Fig. 1, with its shoulder between the points $k'$ and $k^2$ in engagement with pin $l$, the movable jaw $i$ is in its most remote position from the abutment $h$, and rotation of the cam in the direction of the arrow moves it toward the abutment. On the face of the cam $k$ adjacent its periphery are put radial graduation-marks, which are arranged to represent fractions of any desired unit, such as a millimeter, &c., and by reference to the pin $l$ serve to show the distance by which the measuring-jaws are separated. As pin $l$ moves only from $k^2$ to $k'$ in a complete rotation of the cam while a large number of graduations spaced sufficiently far apart to be easily read may be placed upon the disk, it is evident that minute fractions of the distance through which the jaw moves are determinable.

The movable jaw is adjusted to regulate its distance from the abutment by a screw $m$, threaded into a reduced extension $f^2$ of the slide $f$, and is clamped in any position of adjustment by screws $n$, extending through a split portion of the jaw which embraces the extension $f^2$. The abutment $h$ is also adjustable to permit of objects having a large range of size being measured. It is to permit of such adjustment that the abutment is mounted slidably in the guideway $e$. It is held normally in one position by means of a stop $o$, pivoted at $o'$ and having several arms $p$, which are of different lengths. The stop member is movable, so that any one of the stop-arms may be brought into engagement with the end of the abutment, and the distance of the latter from the movable jaw depends on which of the stop-arms engages it. Preferably when the longest arm $p$ engages the abutment the jaws may be brought into contact. The difference between the successive stop-arms is preferably one unit, or the amount of movement effected by a complete revolution of the graduated disk, so that by moving successive arms adjacent the abutment additional units may be added to the range of movement of the jaws. The stop limits the movement of the abutment from the movable jaw, while a spring $q$, bearing against a stud $r$ on the abutment, retains it against the stop. This spring also bears against a stud $s$ on the slide $f$ and holds the pin $l$ of the latter against the cam, and thus normally tends to separate the jaws.

For turning the cam I provide a finger member consisting of a sleeve $t$, having a flange $t'$, adapted to be grasped and rolled between the thumb and finger of the user. This sleeve fits upon a hub $k^3$ of the disk and is held thereon by a screw $u$ and washer $u'$. There is a certain amount of friction between the sleeve and hub, so that the disk may be turned by the former when the resistance is not great; but the friction is so slight that the sleeve will slip as soon as any considerable resistance is encountered. Thereby when an article being measured is grasped between the jaws the movement of the latter will be stopped before any pressure sufficient to indent the object and vitiate the result or to injure either jaw or the cam can be applied.

Friction is produced by a spring-tongue $t^2$, formed on the sleeve, as shown in Figs. 10 and 11.

An additional dial $v$ is secured upon the stud $j$ on the opposite side of the body portion from the cam $k$, this dial having graduations which by reference to a fixed pointer $v'$ serve to indicate the size of the object being measured when a reading on the cam-dial $k$ cannot conveniently be obtained.

It will be noted from Figs. 2 and 3 that the dial $v$ and stop member $o$ are set into recesses in the body, so that their outer surfaces, as well as the surfaces of the measuring-jaws and the body portion, are all in the same plane without any part except the pointer $v'$ projecting beyond such plane. This permits the instrument to be used in occasional special conditions where the parts to be measured consist of a small projection extending from a piece of large area.

If desired, the instrument may be made with provisions for varying degrees of sensitiveness—that is, the rate of change of eccentricity may be made different in different parts of the cam, so that in certain positions of the cam more minute differences of size may be detected. In Fig. 7, which is on a somewhat enlarged scale, the cam is shown as having the part between the points $k'$ and the mark $k^4$ with less rapidly diminishing radii of curvature than the remaining portion of the cam. Thus this quadrant of the cam from $k'$ to $k^4$ measures in hundredths of a unit, while on the other portions of the cam the figures read in tenths, and the recession of the periphery in passing from $k'$ to $k^4$ is no greater than going from $k^4$ to $k^5$—that is, three-tenths of a unit. This is to enable the instrument to be used readily for two different classes of measurement, such as measuring the thicknesses and widths of watch-mainsprings. The form of the invention shown in Fig. 7 is particularly designed for the special work of measuring mainsprings of which the thicknesses do not exceed three-tenths of a millimeter, and when the movable gage member $i$ is within three-tenths of a millimeter of the abutment $h$ some part of the cam portion $k'$ $k^4$ is in contact with the part $i$. When this part of the cam is operated, its movement by one of the divisions will move the member $i$ one-hundredth of a millimeter, and when the other portion of the cam is adjacent member $i$ the jaws may be separated enough to permit the insertion of a mainspring flatwise, so that its width may be measured. The main divisions of this part of the scale denote tenths of a millimeter and are sufficient for the purpose of measuring widths, while the thicknesses in which great accuracy is required are cared for by the finer divisions. In this form of device the stationary abutment is clamped in a groove of the arm $a'$ by a screw $n'$ and is adjusted by a screw $m'$. The movable jaw $i$ travels in the same groove and is held against the cam $k$ by means of a spring $q'$. The disk is provided with a hub portion $k^3$, which turns about a stud $j'$, fixed in the body $a$ instead of being rotatable therein, as in Fig. 2. The frictional sleeve $t$, mounted upon the hub $k^3$, is the same as that already described.

Although with this device very fine measurements can be secured with great accuracy, the device is yet very simple and inexpensive.

I claim—

1. A micrometric measuring instrument comprising relatively fixed and movable jaws, and a graduated disk having an eccentric cam-shaped perimeter engaged with the movable jaw.

2. A micrometric measuring instrument comprising relatively fixed and movable jaws, and a graduated disk having a cam-shaped perimeter engaged with the movable jaw, said cam portion being of constantly varying eccentricity proportional to the graduations of the disk.

3. A micrometric measuring instrument comprising relatively fixed and movable jaws, and a graduated disk having a spiral cam portion in one plane engaged with the movable jaw.

4. A micrometric measuring instrument comprising a relatively fixed abutment, a jaw movable toward and from said abutment, and a graduated flat disk having its periphery formed as a cam engaged with the jaw, the abutment being adjustable to vary its distance from the jaw.

5. In a micrometric measuring instrument, a spiral cam having a plurality of portions of regularly-changing eccentricity, the rates of variation in the eccentricities of the several portions being different, and the cam having reference graduations on each of the different portions, which represent different units proportional to the various changes of eccentricity.

6. In a micrometric measuring instrument, a spiral cam having a plurality of portions of regularly-changing eccentricity, the rates of variation in the eccentricities of the several portions being different, and the cam having separate sets of graduations reading in terms of the various differences in eccentricity.

7. A micrometric measuring instrument comprising a graduated disk having its periphery formed as a spiral or snail, a fixed abutment, a member movable in a straight line toward and from said abutment, and engaged with the periphery of said disk, and a spring tending to hold said movable member against the disk.

8. A micrometric measuring instrument comprising a graduated disk having its periphery formed as a spiral or snail, a fixed abutment, a member movable in a straight line toward and from said abutment, and engaged with the periphery of said disk, and a spring tending to hold said movable member against the disk, the abutment being adjustable in the line of movement of the member.

9. In a micrometric measuring instrument, a rotary disk having graduations and formed with its periphery gradually approaching the pivot from the most extended point, in an involute curve, and a caliper-jaw or gage member rectilinearly operable by said disk; one portion of the disk periphery being of less abrupt curvature than the rest, whereby a corresponding angular movement of this portion of the disk will produce less motion of the gage member.

10. In a micrometric measuring instrument, a stationary abutment, a gage member movable toward and from said abutment, a cam-disk for moving said member and having a scale for indicating the distance thereof from the abutment, and a finger-piece for moving said disk, having a frictional engagement therewith and adapted to slip when a resistance is encountered of greater force than the friction.

11. In a micrometric measuring instrument, a stationary abutment, a gage member movable toward and from said abutment, a cam-disk for moving said member and having a scale for indicating the distance thereof from the abutment, a coaxial projection on said disk at the pivot thereof, and an operating member frictionally engaged with said projection for turning the disk, adapted to slip when a resistance of greater force than the friction is encountered and prevent injury to the parts and to insure uniform and safe pressure.

12. In a micrometric measuring instrument, a stationary abutment, a gage member movable toward and from said abutment, a cam-disk for moving said member and having a scale for indicating the distance thereof from the abutment, a hub on the disk, and a sleeve mounted on said hub with a frictional engagement, adapted to be grasped and turned manually for revolving the disk, and to slip when the movable member is arrested.

13. A micrometric measuring instrument comprising a support or body, a normally stationary abutment, a movable gage member, a rotary cam-disk engaged with said gage member for moving it relatively to said abutment and having graduations for measuring the amount of such movement, and a graduated dial connected to said disk and movable therewith.

14. A micrometric measuring instrument comprising a support or body, a normally stationary abutment, a movable gage member, a rotary cam-disk on one side of the body engaged with said gage member for moving it relatively to said abutment and having graduations for measuring the amount of such movement, and a graduated dial connected to said disk on the opposite side of the body from the disk and movable therewith.

15. A micrometric measuring instrument comprising a support or body, a normally stationary adjustable abutment, a movable gage member, a rotary cam-disk engaged with said gage member for moving it relatively to said abutment and having graduations for measuring the amount of such movement, and a stop, against which said abutment is adapted to bear, displaceable to permit shifting of said abutment.

16. A micrometric measuring instrument comprising a support or body, a normally stationary adjustable abutment, a movable gage member, a rotary cam-disk engaged with said gage member for moving it relatively to said abutment and having graduations for measuring the amount of such movement, a plurality of stops displaceable to permit each to engage separately with the abutment and adapted to sustain the abutment in different positions, and means tending to hold the abutment in engagement with the nearest stop.

17. A micrometric measuring instrument comprising a support or body, a normally stationary adjustable abutment, a movable gage member, a rotary cam-disk engaged with said gage member for moving it relatively to said abutment and having graduations for measuring the amount of such movement, a pivoted member having a plurality of stop-arms of different lengths movable to bring any single arm adjacent the abutment, and yielding means tending to hold the abutment against the nearest stop-arm.

18. A micrometric measuring instrument comprising a movable jaw, a normally stationary jaw or abutment adjustable toward and from said movable jaw, a cam engaging said movable jaw for moving it toward the abutment, a stop for limiting the movement of the abutment away from the movable jaw, and a spring tending to hold the jaws separated, with the abutment in contact with said stop and the movable jaw in engagement with the disk.

In testimony whereof I have affixed my signature in presence of two witnesses.

EDWARD A. MARSH.

Witnesses:
A. C. RATIGAN,
H. L. ROBBINS.